United States Patent
Chen et al.

(10) Patent No.: US 11,629,779 B1
(45) Date of Patent: Apr. 18, 2023

(54) MODULAR TELESCOPIC ARM BY MOTOR CONTROL

(71) Applicant: Cheng Uei Precision Industry Co., LTD., New Taipei (TW)

(72) Inventors: Ming-Tsung Chen, New Taipei (TW); Jun-Wei Huang, New Taipei (TW); Pei-Fen Wu, New Taipei (TW); Jung-Kuang Liu, New Taipei (TW); Kun-Cheng Li, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/837,005

(22) Filed: Jun. 9, 2022

(30) Foreign Application Priority Data

Nov. 17, 2021 (TW) .................................. 110213592

(51) Int. Cl.
*F16H 25/22* (2006.01)
*F16H 25/20* (2006.01)

(52) U.S. Cl.
CPC . *F16H 25/2204* (2013.01); *F16H 2025/2031* (2013.01); *F16H 2025/2075* (2013.01)

(58) Field of Classification Search
CPC ......... F16H 25/2204; F16H 2025/2031; F16H 2025/2075
See application file for complete search history.

(56) References Cited

U.S. PATENT DOCUMENTS

| 4,795,172 A * | 1/1989 | Brande | F16J 15/54 277/354 |
| 2001/0045783 A1* | 11/2001 | Hagiike | F16H 25/20 310/80 |
| 2005/0081660 A1* | 4/2005 | Migliori | F16H 25/20 74/25 |
| 2005/0150873 A1* | 7/2005 | Schmitt-Walter | B23K 11/317 219/86.32 |
| 2008/0282840 A1* | 11/2008 | Shimada | F16H 25/20 74/841 |
| 2015/0330497 A1* | 11/2015 | Amano | F16H 57/0497 74/89.41 |
| 2018/0333842 A1* | 11/2018 | McEntee | F16H 25/2204 |
| 2020/0141474 A1* | 5/2020 | Lim | F16H 25/20 |
| 2020/0164457 A1* | 5/2020 | Rosengren | H02K 7/00 |

(Continued)

FOREIGN PATENT DOCUMENTS

WO WO-2005067674 A2 * 7/2005 ............. B23K 11/31

*Primary Examiner* — David M Fenstermacher
(74) *Attorney, Agent, or Firm* — Cheng-Ju Chiang

(57) ABSTRACT

A modular telescopic arm by motor control includes a knuckle module, a telescopic module, an outer sleeve module and an inner sleeve module. The telescopic module is disposed to one end of the knuckle module. The telescopic module includes a ball screw assembly. The ball screw assembly has a screw shaft, and a nut disposed around the screw shaft. The nut is able to slide along the screw shaft. The outer sleeve module is mounted around the one end of the knuckle module. The screw shaft is longitudinally mounted in the outer sleeve module. The inner sleeve module is disposed to the one end of the knuckle module, and the inner sleeve module surrounds a part of the telescopic module. The outer sleeve module surrounds the inner sleeve module. One end of the inner sleeve module is fastened around the nut.

16 Claims, 13 Drawing Sheets

(56) References Cited

U.S. PATENT DOCUMENTS

| | | | |
|---|---|---|---|
| 2021/0016339 A1* | 1/2021 | Takeda | B25J 9/123 |
| 2021/0220989 A1* | 7/2021 | Shindo | F16H 25/2204 |
| 2021/0341099 A1* | 11/2021 | Zhao | F16M 11/18 |
| 2021/0364070 A1* | 11/2021 | Keranen | F16H 25/2247 |
| 2022/0341486 A1* | 10/2022 | Kalvatn | F16H 25/2015 |

* cited by examiner

MODULAR TELESCOPIC ARM BY MOTOR CONTROL

CROSS-REFERENCE TO RELATED APPLICATION

The present application is based on, and claims priority from, Taiwan Patent Application No. 110213592, filed Nov. 17, 2021, the disclosure of which is hereby incorporated by reference herein in its entirety.

BACKGROUND OF THE INVENTION

1. Field of the Invention

The present invention generally relates to a robot arm, and more particularly to a modular telescopic arm by motor control.

2. The Related Art

With the increasingly rapid development of sciences and technologies, conventional multi-axis robot arms are more and more used in industrial productions. Currently, the conventional multi-axis robot arm generally includes a plurality of knuckle modules and a plurality of arm modules. Each arm module is connected between two knuckle modules. Each arm module is fixed between the two knuckle modules. However, the current arm module which is connected between the two knuckle modules has a constant length structure, so the current arm module is unable to change a length, and a usage scope of the conventional multi-axis robot arm is severely restricted, correspondingly the conventional multi-axis robot arm is just able to be restrictively used in a specific situation.

The conventional multi-axis robot arm includes a pedestal, the plurality of the knuckle modules and at least one telescopic arm module. Two ends of two adjacent knuckle modules which are close to each other have a first connecting structure and a second connecting structure, respectively. The at least one telescopic arm module includes a telescopic tube and a telescopic shaft. One end of the telescopic tube is connected to the first connecting structure. The one end of the telescopic tube is fastened to the first connecting structure. A surface of the other end of the telescopic tube faces the second connecting structure. One end of the telescopic shaft is connected to the second connecting structure. The one end of the telescopic shaft is fastened to the second connecting structure. The other end of the telescopic shaft projects into the telescopic tube. The telescopic shaft is axially telescopic with respect to the telescopic tube. At least two telescopic positions of the telescopic shaft which are opposite to each other is fastened to the telescopic tube through fastening elements. The at least one telescopic arm module has telescopic structures, and the at least one telescopic arm module is able to appropriate for different usage needs for improving the usage scope of the conventional multi-axis robot arm.

However, the conventional multi-axis robot arm is only able to manually adjust a lengthening distance and a shortening distance of the at least one telescopic arm module. A telescopic distance of the conventional multi-axis robot arm has been set at a factory. Only two distances have been set, and the two distances is unable to be changed arbitrarily during a usage process of the conventional multi-axis robot arm. When a length of the at least one telescopic arm module is adjusted manually, an unstable accuracy condition is easily caused on account of an inaccurate locking force.

Thus, it is essential to provide a modular telescopic arm by motor control. The modular telescopic arm by motor control is able to adjust a lengthening distance and a shortening distance during a usage process of the modular telescopic arm by motor control, and according to users' requirements, the lengthening distance and the shortening distance are able to be adjusted in multiple sections. In this way, an accuracy and a usage scope of the modular telescopic arm by motor control are greatly improved.

SUMMARY OF THE INVENTION

An object of the present invention is to provide a modular telescopic arm by motor control. The modular telescopic arm by motor control includes a knuckle module, a telescopic module, an outer sleeve module and an inner sleeve module. The telescopic module is disposed to one end of the knuckle module. The telescopic module includes a ball screw assembly and a limiting ring. The limiting ring is disposed to one end of the ball screw assembly. The ball screw assembly has a screw shaft disposed longitudinally, and a nut disposed around the screw shaft. The nut is able to transversely slide along the screw shaft. The limiting ring is disposed at a free end of the screw shaft, and the limiting ring faces one end of the nut. The outer sleeve module is mounted around the one end of the knuckle module, and the outer sleeve module surrounds the telescopic module. The screw shaft is longitudinally mounted in the outer sleeve module. The inner sleeve module is disposed to the one end of the knuckle module, and the inner sleeve module surrounds a part of the telescopic module. The outer sleeve module surrounds the inner sleeve module. The inner sleeve module surrounds a portion of the screw shaft and the limiting ring. One end of the inner sleeve module is fastened around the nut. When the modular telescopic arm by motor control is lengthened or shortened, the nut of the telescopic module drives the inner sleeve module to axially move towards the limiting ring or away from the limiting ring, the inner sleeve module is stretched out of the outer sleeve module or retracted into the outer sleeve module, a telescopic length of the inner sleeve module is a movement length of the nut and the inner sleeve module moving towards the limiting ring or moving away from the limiting ring.

Another object of the present invention is to provide a modular telescopic arm by motor control. The modular telescopic arm by motor control includes a knuckle module, a telescopic module, an outer sleeve module and an inner sleeve module. A front end the knuckle module has an outer shoulder, a middle shoulder and an inner shoulder. A periphery of the front end of the knuckle module protrudes frontward and outward to form the outer shoulder. A middle of a front end of the outer shoulder extends frontward to from the middle shoulder. A periphery of a middle of a front end of the middle shoulder extends frontward to form the inner shoulder. The telescopic module is mounted to the front end of the knuckle module. The telescopic module includes a ball screw assembly, a first flange, a shaft coupler and a limiting ring. The first flange is fastened to the inner shoulder of the knuckle module. One end of the shaft coupler is connected with the ball screw assembly. The other end of the shaft coupler is connected with the first flange. The ball screw assembly has a screw shaft disposed longitudinally, a nut disposed around the screw shaft, and a fixing element. The nut is disposed between the fixing element and the limiting ring. The fixing element is disposed between the nut and the first flange. The shaft coupler is disposed to the screw shaft of the ball screw assembly, and the shaft coupler is close to one end of the fixing element of the ball screw assembly. The limiting ring is disposed to the screw shaft of the ball screw assembly, and the limiting ring faces one end of the nut of the ball screw assembly. The outer sleeve module is mounted around the one end of the knuckle module, and the outer sleeve module surrounds the telescopic module. The screw shaft is longitudinally mounted in the outer sleeve module. The inner sleeve module is disposed to the one end of the knuckle module, and the inner sleeve module surrounds a portion of the screw shaft and the limiting ring. The outer sleeve module surrounds the inner sleeve module. One end of the inner sleeve module is fastened around the nut. When the modular telescopic arm by motor control is lengthened or shortened, the nut of the telescopic module drives the inner sleeve module to axially move towards the limiting ring or away from the limiting ring, the inner sleeve module is stretched out of the outer sleeve module or retracted into the outer sleeve module, a telescopic length of the inner sleeve module is a movement length of the nut and the inner sleeve module moving towards the limiting ring or moving away from the limiting ring.

Another object of the present invention is to provide a modular telescopic arm by motor control. The modular telescopic arm by motor control includes a knuckle module, a telescopic module, an outer sleeve module and an inner sleeve module. The telescopic module is disposed to one end of the knuckle module. The telescopic module includes a ball screw assembly and a limiting ring. The limiting ring is disposed to one end of the ball screw assembly. The ball screw assembly has a screw shaft disposed longitudinally, and a nut disposed around the screw shaft. The nut is able to slide along the screw shaft. The limiting ring is disposed at a free end of the screw shaft, and the limiting ring faces one end of the nut. The outer sleeve module is mounted around the one end of the knuckle module, and the outer sleeve module surrounds the telescopic module. The screw shaft is longitudinally mounted in the outer sleeve module. An upper portion and a lower portion of an inner surface of the outer sleeve module are connected with a plurality of sliders. A middle of an inner surface of each slider is recessed vertically to form an indentation. The inner sleeve module is disposed to the one end of the knuckle module, and the inner sleeve module surrounds a part of the telescopic module. The outer sleeve module surrounds the inner sleeve module. The inner sleeve module surrounds a portion of the screw shaft and the limiting ring. One end of the inner sleeve module is fastened around the nut. The inner sleeve module has a hollow telescopic shaft, a third flange and two slide rails. A top and a bottom of the telescopic shaft are recessed inward to form two assembling grooves, respectively. The third flange is disposed to one end of the telescopic shaft. The other end of the telescopic shaft surrounds the nut of the telescopic module. One sides of the two slide rails are disposed in the two assembling grooves, and the other sides of the two slide rails are slidably disposed in the indentations of the plurality of sliders. When the modular telescopic arm by motor control is lengthened or shortened, the nut of the telescopic module drives the inner sleeve module to axially move towards the limiting ring or away from the limiting ring, the inner sleeve module is stretched out of the outer sleeve module or retracted into the outer sleeve module, a telescopic length of the inner sleeve module is a movement length of the nut and the inner sleeve module moving towards the limiting ring or moving away from the limiting ring.

As described above, the knuckle module of the modular telescopic arm by motor control, controls a telescopic distance of the inner sleeve module, according to users' needs, the modular telescopic arm by motor control is able to adjust the telescopic length in multiple sections of the modular telescopic arm by motor control, the modular telescopic arm by motor control is able to adjust a lengthening distance and a shortening distance during a usage process of the modular telescopic arm by motor control, and according to users' requirements, the lengthening distance and the shortening distance are able to be adjusted in the multiple sections of the modular telescopic arm by motor control, so the lengthening distance and the shortening distance of the modular telescopic arm by motor control are able to be changed arbitrarily. As a result, an accuracy and a usage scope of the modular telescopic arm by motor control are greatly improved.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
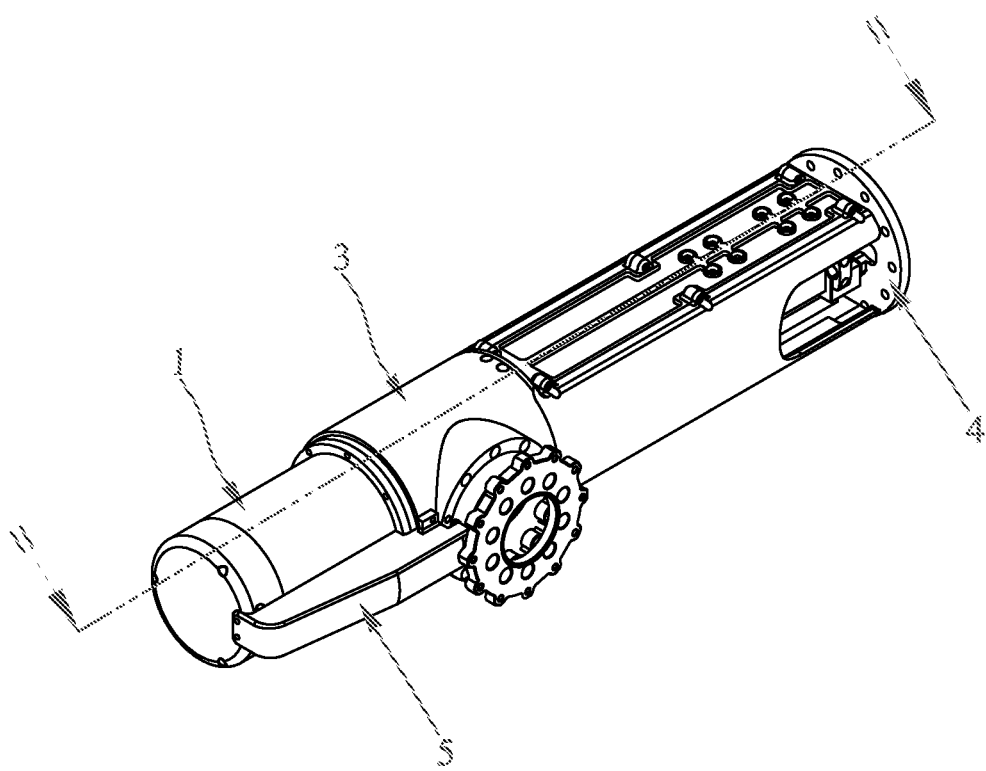
FIG. 1 is a perspective view of a modular telescopic arm by motor control, wherein the perspective view of the modular telescopic arm by motor control is shown according to a preferred embodiment of the present invention, and the modular telescopic arm by motor control is in a retracted state.

With reference to FIG. 1, FIG. 3, FIG. 4 and FIG. 12, a modular telescopic arm by motor control 100 in accordance with a preferred embodiment of the present invention is shown. The modular telescopic arm by motor control 100 includes a knuckle module 1, a telescopic module 2, an outer sleeve module 3, an inner sleeve module 4, an outer cover 5 and a plurality of fastening elements 6.

The telescopic module 2 is disposed to one end of the knuckle module 1. The outer sleeve module 3 is mounted around the one end of the knuckle module 1, and the outer sleeve module 3 surrounds the telescopic module 2. The inner sleeve module 4 is disposed to the one end of the knuckle module 1, and the inner sleeve module 4 surrounds a part of the telescopic module 2. The outer sleeve module 3 surrounds the inner sleeve module 4. The outer cover 5 is disposed to one side of the knuckle module 1. The outer cover 5 is used for covering wires (not shown). The plurality of the fastening elements 6 are disposed to one side of the outer sleeve module 3 and one side of the inner sleeve module 4, respectively. The one side of the outer sleeve module 3 and the one side of the inner sleeve module 4 are located at the same side of the modular telescopic arm by motor control 100. The fastening element 6 is used for fastening the wires (not shown). In the preferred embodiment, the telescopic module 2, the outer sleeve module 3, the inner sleeve module 4 and the plurality of the fastening elements 6 are disposed to the same end of the knuckle module 1. The modular telescopic arm by motor control 100 includes the knuckle module 1, and the telescopic module 2, the outer sleeve module 3 and the inner sleeve module 4 assembled to the knuckle module 1, so the modular telescopic arm by motor control 100 is modularized.

Referring to FIG. 3 to FIG. 6, the knuckle module 1 is used for providing power to drive the telescopic module 2 to operate a stretching action or a retracting action so as to control a telescopic distance of the inner sleeve module 4. According to users' needs, the telescopic distance of the inner sleeve module 4 is able to be adjusted in multiple sections of the modular telescopic arm by motor control 100. The knuckle module 1 includes a motor 10, a circuit board 11 and a rear cover 12. The circuit board 11 is mounted to a rear end of the motor 10 of the knuckle module 1. The rear cover 12 of the knuckle module 1 covers the circuit board 11 of the knuckle module 1. A front end of the knuckle module 1 has an outer shoulder 13, a middle shoulder 14 and an inner shoulder 15. A front end of the motor 10 of the knuckle module 1 has the outer shoulder 13, the middle shoulder 14 and the inner shoulder 15. A periphery of the front end of the knuckle module 1 protrudes frontward and outward to form the outer shoulder 13. A periphery of the front end of the motor 10 of the knuckle module 1 protrudes frontward and outward to form the outer shoulder 13. A middle of a front end of the outer shoulder 13 of the motor 10 of the knuckle module 1 extends frontward to form the middle shoulder 14. A periphery of a middle of a front end of the middle shoulder 14 of the motor 10 of the knuckle module 1 extends frontward to form the inner shoulder 15. The outer shoulder 13 and the middle shoulder 14 are cylindrical. The inner shoulder 15 is an annular shape.

In the preferred embodiment, corresponding structures of the outer sleeve module 3 are corresponding to the outer shoulder 13 and the middle shoulder 14 of the knuckle module 1, so that the outer sleeve module 3 is located to the knuckle module 1, and the outer sleeve module 3 is fixed to the knuckle module 1. A corresponding mechanism of the telescopic module 2 is fixed to the inner shoulder 15, so that the telescopic module 2 is located to the knuckle module 1, and the telescopic module 2 is fixed to the knuckle module 1. In the preferred embodiment, a diameter of the outer shoulder 13, a diameter of the middle shoulder 14, an outer diameter of the inner shoulder 15 and an inner diameter of the inner shoulder 15 are progressively decreased in sequence.

Referring to FIG. 2 to FIG. 6, the telescopic module 2 is mounted to the one end of the knuckle module 1. The telescopic module 2 is mounted to the front end of the knuckle module 1. The telescopic module 2 includes a ball screw assembly 21, a first flange 22, a shaft coupler 23 and a limiting ring 24. The first flange 22 is fastened to the inner shoulder 15 of the knuckle module 1. The shaft coupler 23 is disposed between the ball screw assembly 21 and the first flange 22. One end of the shaft coupler 23 is connected with the ball screw assembly 21, and the other end of the shaft coupler 23 is connected with the first flange 22. The limiting ring 24 is disposed to one end of the ball screw assembly 21. The limiting ring 24 is disposed to a free end of the ball screw assembly 21.

The ball screw assembly 21 has a screw shaft 211 disposed longitudinally, a nut 212 and a fixing element 213. The nut 212 is disposed around the screw shaft 211, and the nut 212 is able to longitudinally slide along the screw shaft 211. The nut 212 is disposed between the fixing element 213 and the limiting ring 24. The nut 212 is surrounded by the inner sleeve module 4. One end of the inner sleeve module 4 is fastened around the nut 212. The inner sleeve module 4 surrounds a portion of the screw shaft 211 and the limiting ring 24. The screw shaft 211 is longitudinally mounted in the outer sleeve module 3. The fixing element 213 is disposed between the nut 212 and the first flange 22. The fixing element 213 is surrounded by the outer sleeve module 3. The shaft coupler 23 is disposed to one end of the screw shaft 211 of the ball screw assembly 21, and the shaft coupler 23 is close to one end of the fixing element 213 of the ball screw assembly 21. One end of the nut 212 of the ball screw assembly 21 faces the limiting ring 24. The other end of the nut 212 of the ball screw assembly 21 faces the other end of the fixing element 213. The limiting ring 24 is disposed to the other end of the screw shaft 211 of the ball screw assembly 21, and the limiting ring 24 faces the one end of the nut 212 of the ball screw assembly 21. The limiting ring 24 is disposed at a free end of the screw shaft 211 of the ball screw assembly 21. The limiting ring 24 faces a front end of the nut 212 of the ball screw assembly 21.

Figure 2:
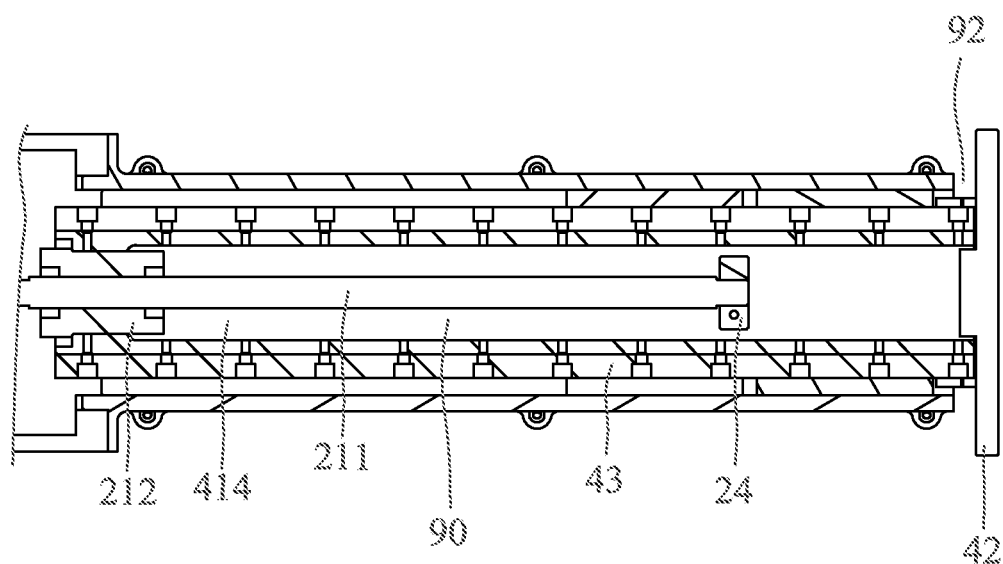
FIG. 2 is a sectional view of the modular telescopic arm by motor control, wherein the sectional view of the modular telescopic arm by motor control is along a line II-II of FIG. 1.
Figure 3:
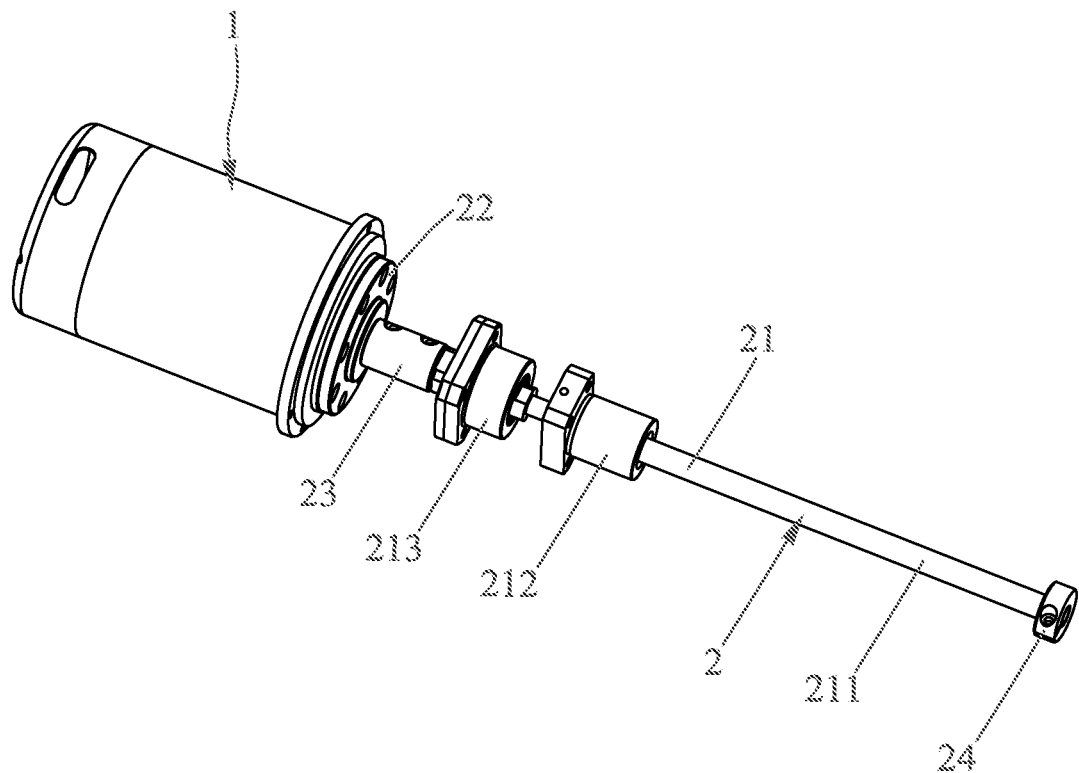
FIG. 3 is a partially perspective view of the modular telescopic arm by motor control of FIG. 1.
Figure 4:
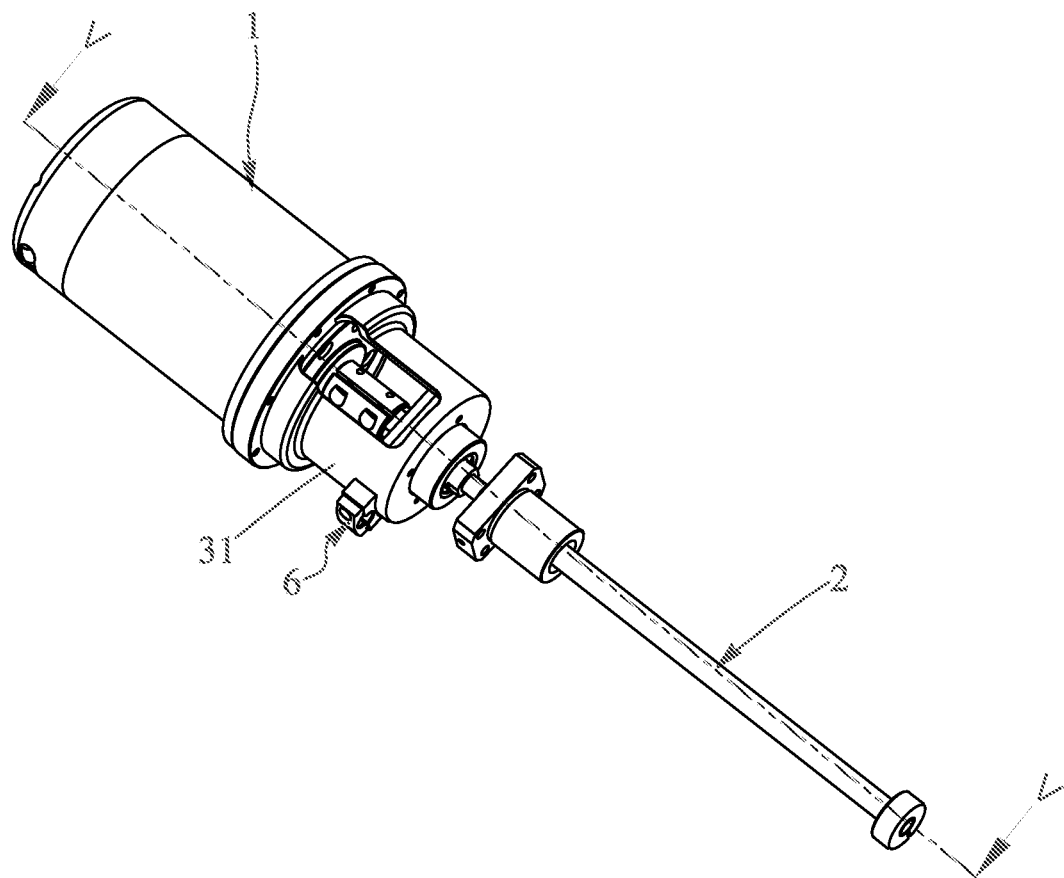
FIG. 4 is another partially perspective view of the modular telescopic arm by motor control of FIG. 1.
Figure 5:
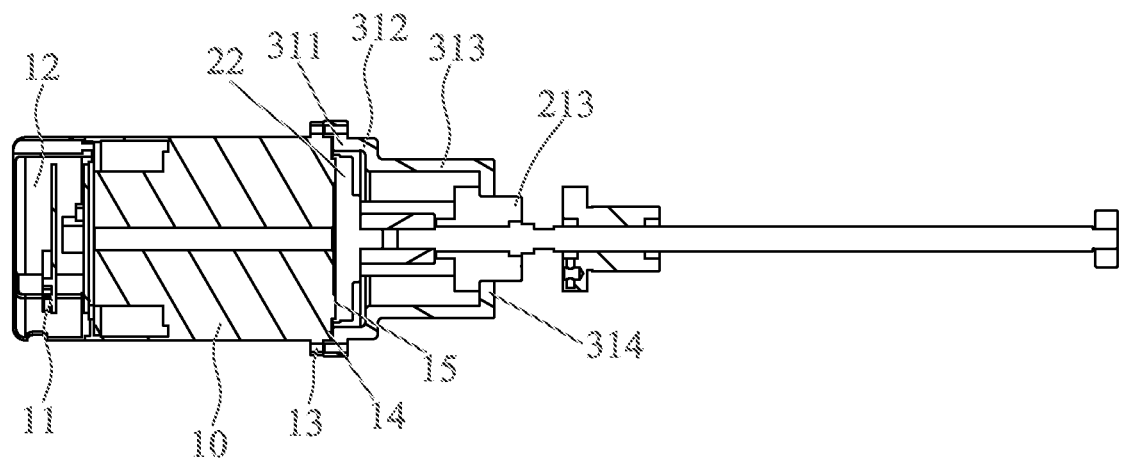
FIG. 5 is a sectional view of the modular telescopic arm by motor control, wherein the sectional view of the modular telescopic arm by motor control is along a line V-V of FIG. 4.
Figure 6:
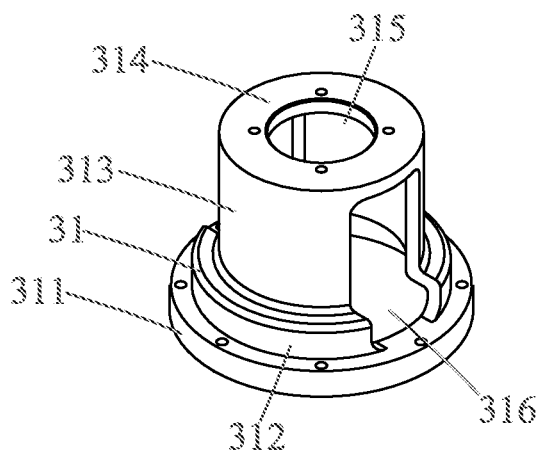
FIG. 6 is a perspective view of the modular telescopic arm by motor control, showing a knuckle module, a first flange and a supporting holder of the modular telescopic arm by motor control of FIG. 1.
Figure 6:
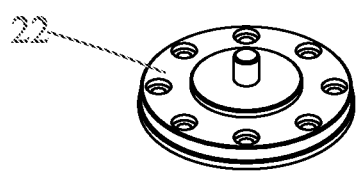
Figure 6:
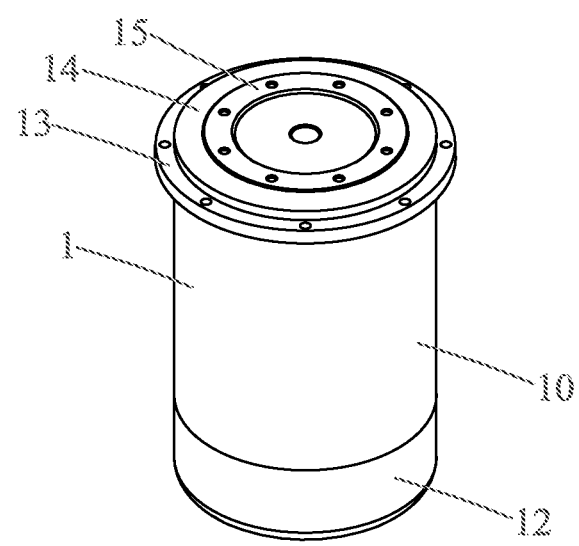
Figure 7:
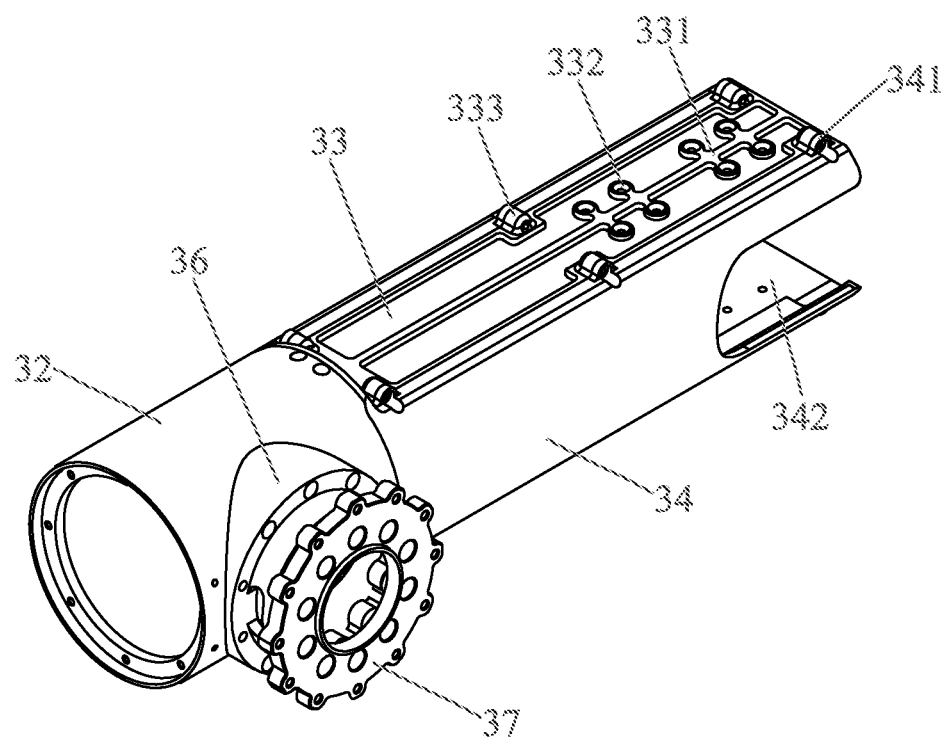
FIG. 7 is a perspective view of an outer sleeve module of the modular telescopic arm by motor control of FIG. 1.
Figure 8:
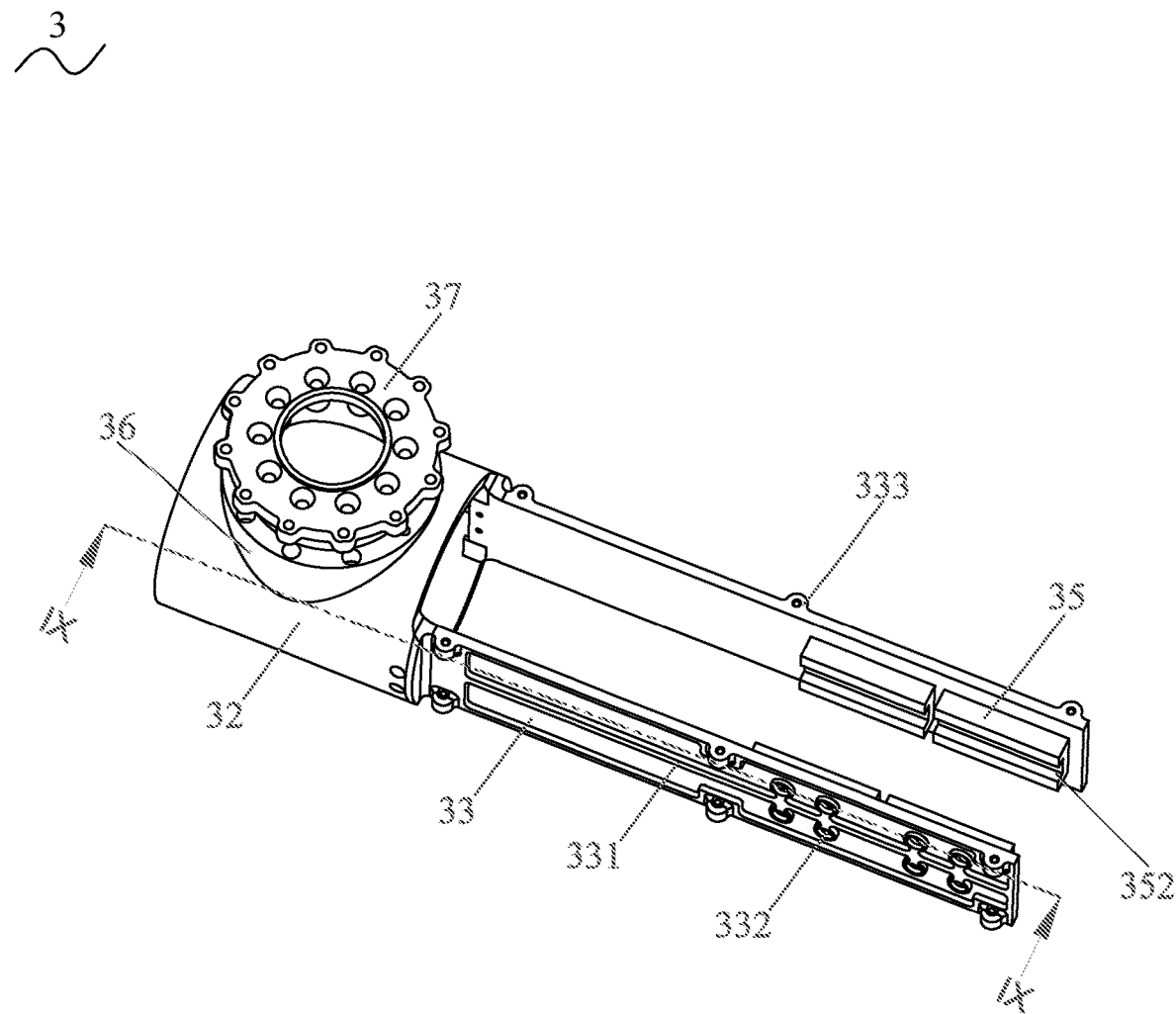
FIG. 8 is another perspective view of the outer sleeve module of the modular telescopic arm by motor control of FIG. 1.
Figure 9:
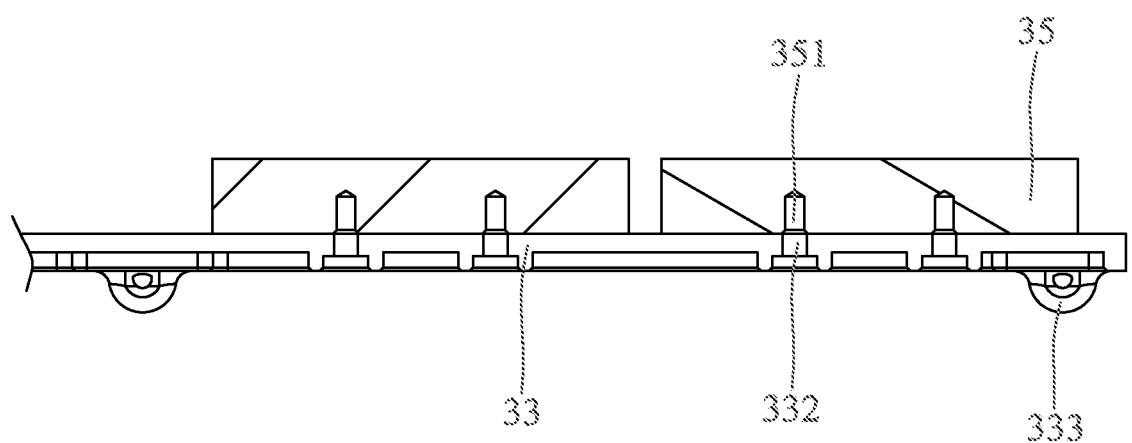
FIG. 9 is a sectional view of the modular telescopic arm by motor control, wherein the sectional view of the modular telescopic arm by motor control is along a line IX-IX of FIG. 8.
Figure 10:
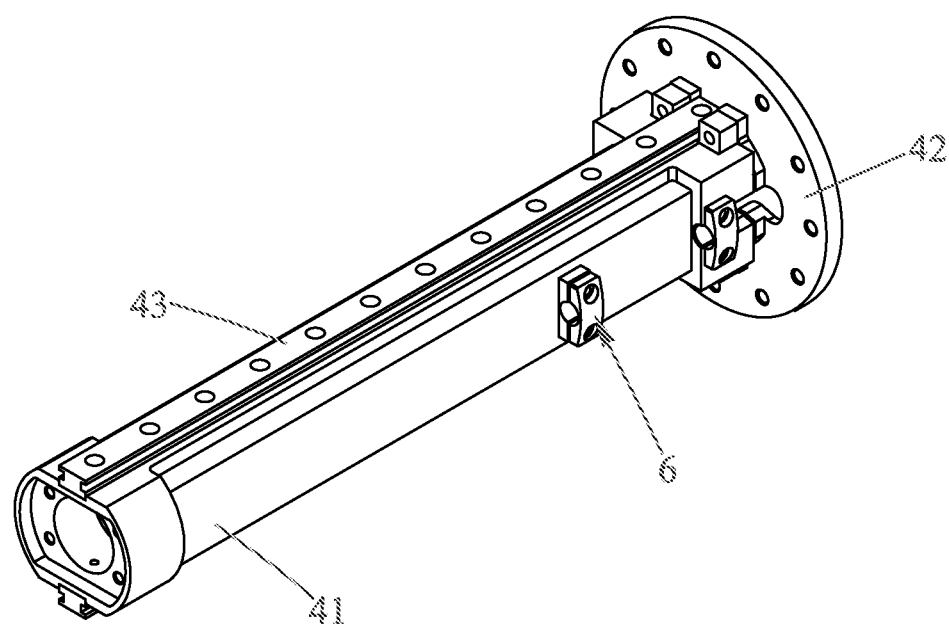
FIG. 10 is a perspective view of an inner sleeve module of the modular telescopic arm by motor control of FIG. 1.
Figure 11:
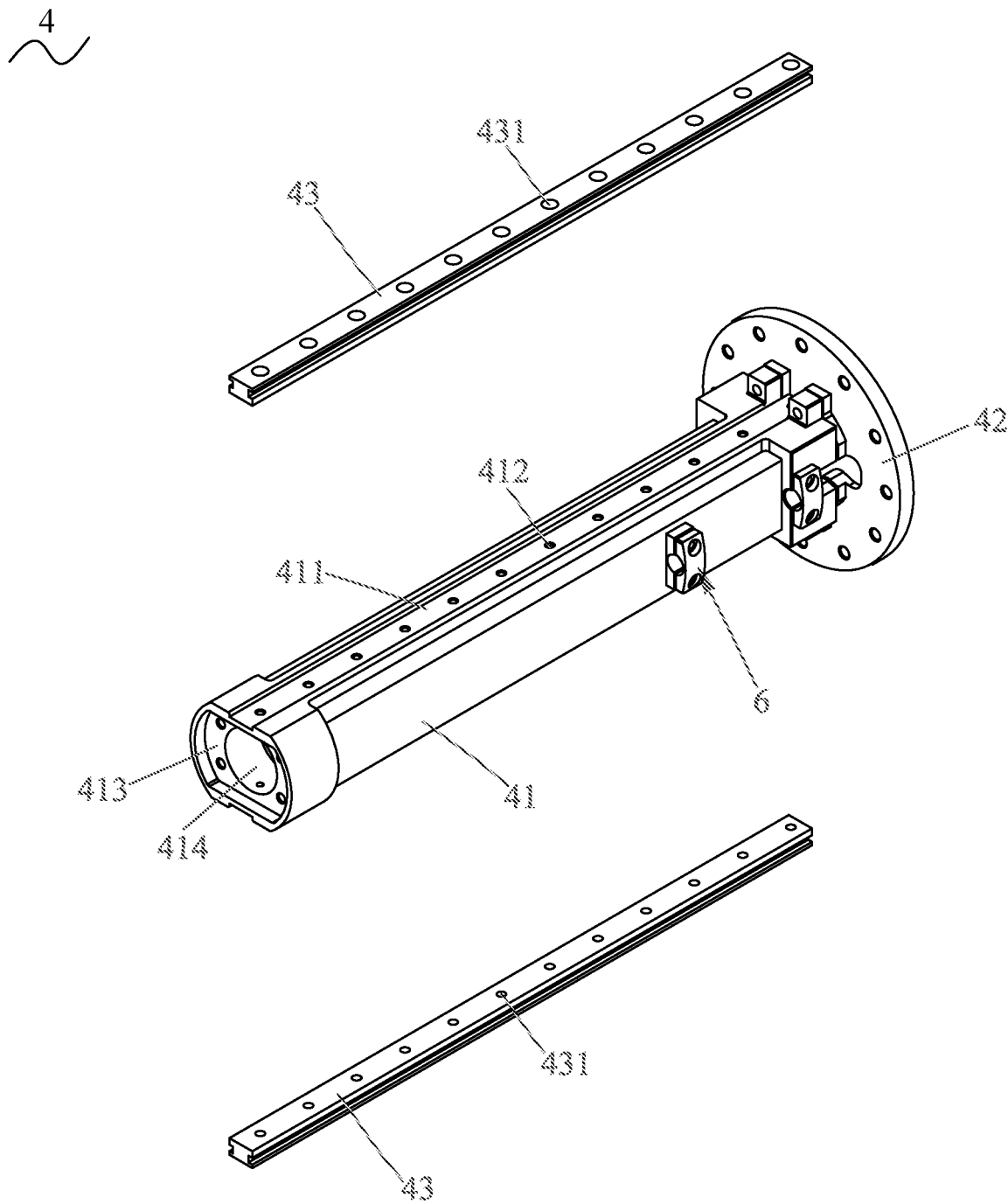
FIG. 11 is an exploded view of the inner sleeve module of the modular telescopic arm by motor control of FIG. 1.
Figure 12:
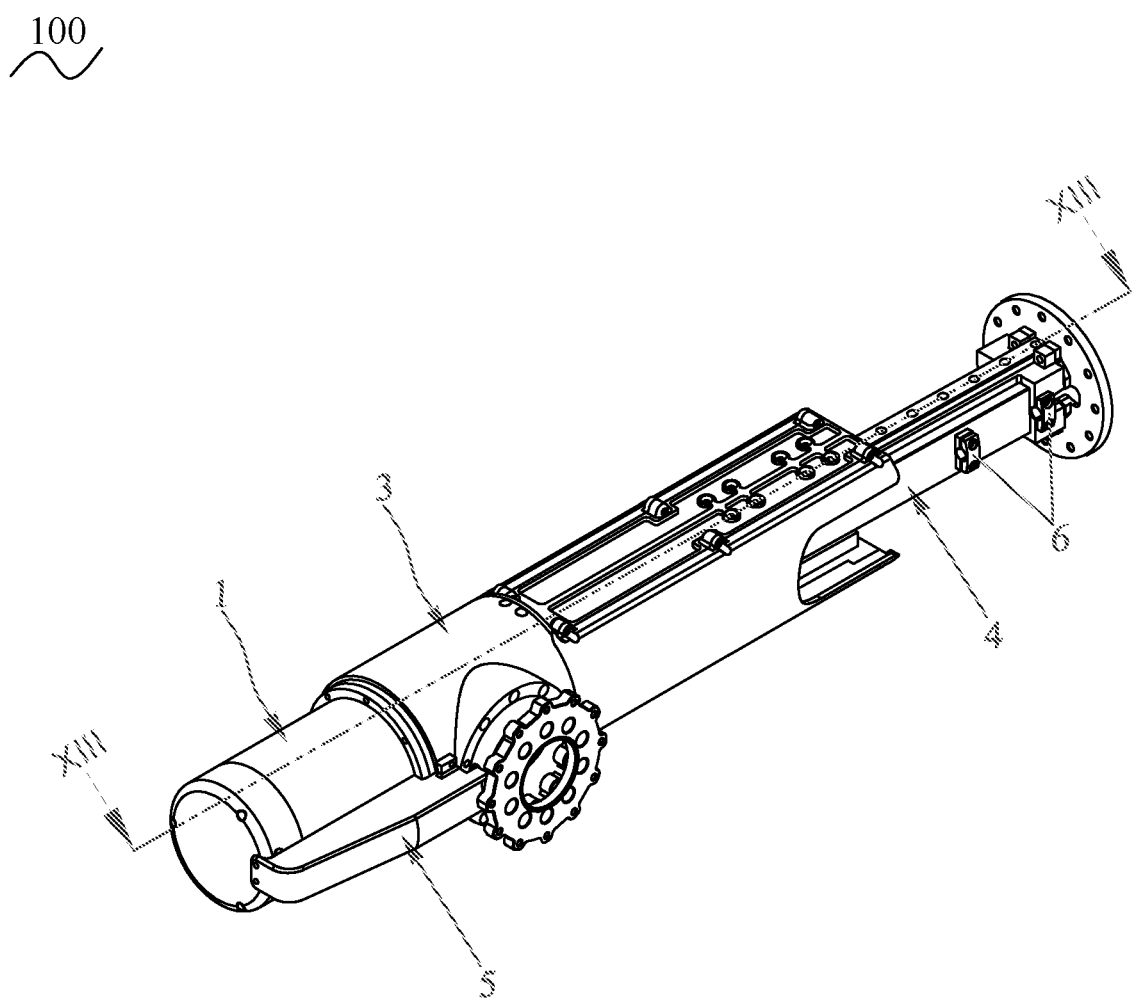
FIG. 12 is a perspective view of the modular telescopic arm by motor control of FIG. 1, wherein the modular telescopic arm by motor control is in an extended state.
Figure 13:
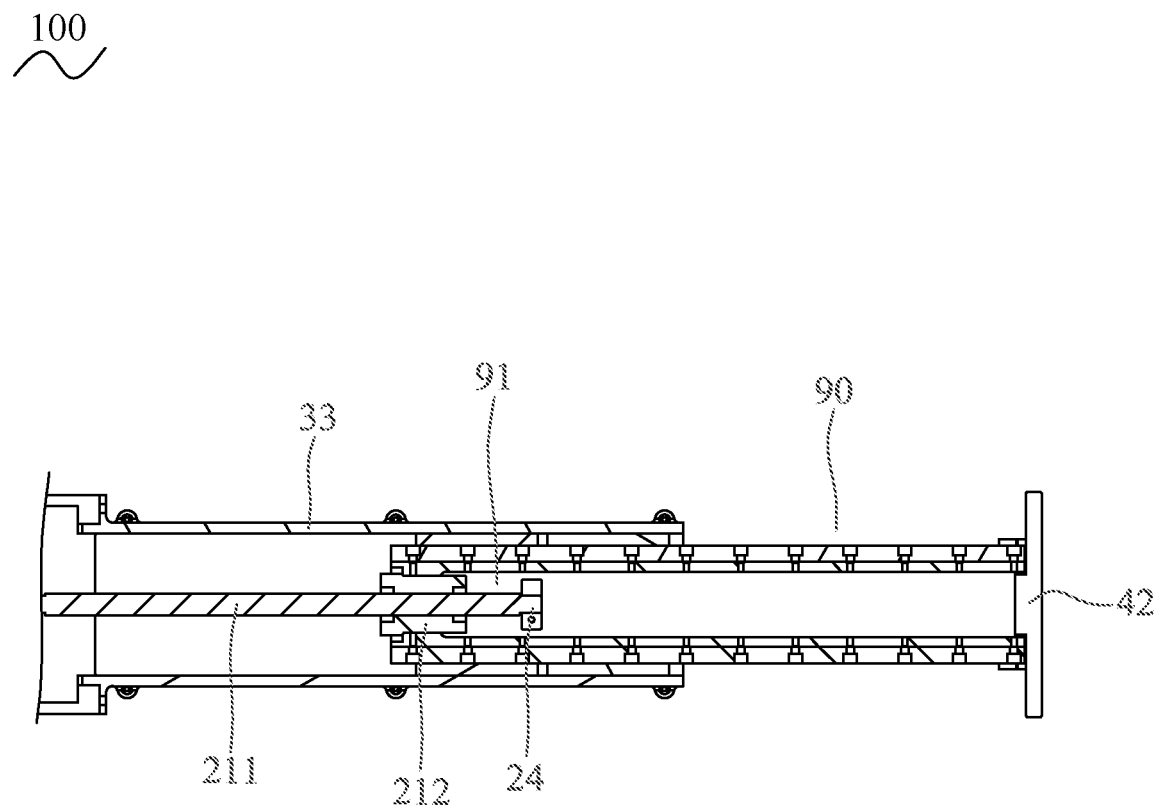
FIG. 13 is a sectional view of the modular telescopic arm by motor control, wherein the sectional view of the modular telescopic arm by motor control is along a line XIII-XIII of FIG. 12.

Referring to FIG. 1, FIG. 2 and FIG. 13, the modular telescopic arm by motor control 100 has a telescopic length 90 and a collision avoidance distance 91. In the preferred embodiment, when the inner sleeve module 4 is fully received in the outer sleeve module 3, the nut 212 is disposed around a first position of the screw shaft 211, and the first position of the screw shaft 211 is defined as a retracting position. When the inner sleeve module 4 is fully stretched out of the outer sleeve module 3, the nut 212 is disposed around a second position of the screw shaft 211, and the second position of the screw shaft 211 is defined as a stretching position. When the nut 212 is located at the stretching position, a distance between the nut 212 and the limiting ring 24 is defined as the collision avoidance distance 91. A rear end of the inner sleeve module 4 surrounds the nut 212, when the screw shaft 211 and the nut 212 are located at the retracting position, the inner sleeve module 4 is located at the retracting position, and when the screw shaft 211 and the nut 212 are located at the stretching position, the inner sleeve module 4 is located at the stretching position.

A distance between the stretching position and the retracting position defines the telescopic length 90. The inner sleeve module 4 telescopically moves in the modular telescopic arm by motor control 100. When the inner sleeve module 4 longitudinally moves between the retracting position and the stretching position, a movement length of the nut 212 and the inner sleeve module 4 moving towards the limiting ring 24 or moving away from the limiting ring 24 is the telescopic length 90 of the inner sleeve module 4 of the modular telescopic arm by motor control 100. In the concrete implementation, the modular telescopic arm by motor control 100 is able to adjust the collision avoidance distance 91, and the collision avoidance distance 91 is even able to be canceled. When the nut 212 abuts against the limiting ring 24 along the screw shaft 211, the nut 212 is disposed around a third position of the screw shaft 211, so a distance between the retracting position of the nut 212 and the screw shaft 211 and the third position of the nut 212 and the screw shaft 211 is defined as a maximum distance of the telescopic length 90 of the modular telescopic arm by motor control 100.

Referring to FIG. 5 to FIG. 9, the outer sleeve module 3 is mounted around the one end of the knuckle module 1, and the outer sleeve module 3 surrounds the telescopic module 2. The outer sleeve module 3 includes a supporting holder 31, a barrel element 32, two extending plates 33, two side covers 34, a plurality of sliders 35, a connecting structure 36 and a second flange 37. An upper portion and a lower portion of an inner surface of the outer sleeve module 3 are connected with the plurality of the sliders 35. One end of the supporting holder 31 is fastened to the outer shoulder 13 and the middle shoulder 14 of the knuckle module 1. The other end of the supporting holder 31 surrounds the fixing element 213 of the telescopic module 2. The barrel element 32 surrounds the supporting holder 31. One end of the barrel element 32 is close to the knuckle module 1, and the one end of the barrel element 32 is fastened to the supporting holder 31 of the outer sleeve module 3. The other end of the barrel element 32 is away from the knuckle module 1, and two portions of the other end of the barrel element 32 extend frontward and towards the limiting ring 24 of the telescopic module 2 to form the two extending plates 33. One side cover 34 is disposed between two sides of two extending plates 33. The other side cover 34 is disposed between the other two sides of the two extending plates 33. The two side covers 34 are used for fastening to the two extending plates 33.

In the preferred embodiment, the plurality of the sliders 35 are disposed at the two front ends of the two inner surfaces of the two extending plates 33. The inner surface of each extending plate 33 has two sliders 35 arranged longitudinally. The two sliders 35 of one extending plate 33 are opposite to the two sliders 35 of the other extending plate 33. A quantity of the plurality of the sliders 35 of the outer sleeve module 3 is four. In a concrete implementation, the quantity of the plurality of the sliders 35 of the outer sleeve module 3 is without being limited to the quantity of the plurality of the sliders 35 in the preferred embodiment of the present invention. One side of the barrel element 32 has the connecting structure 36. In the concrete implementation, the connecting structure 36 is chosen as a nested structure or a loop structure etc. Correspondingly, a specific cooperation structure of the barrel element 32 and the connecting structure 36 is chosen as the nested structure or the loop structure etc. for playing a reliable fixing function. One end of the connecting structure 36 is connected with the second flange 37. The second flange 37 is used for being connected with other knuckle modules 1 of the modular telescopic arm by motor control 100 to form a multi-axis robot arm.

The supporting holder 31 has a base 311, a stepping portion 312, an extending portion 313, a blocking surface 314, a first location hole 315 and two lacking grooves 316. The base 311 is fastened to the outer shoulder 13 and the middle shoulder 14 of the knuckle module 1 to realize that the supporting holder 31 of the outer sleeve module 3 is located to the knuckle module 1, and the supporting holder 31 of the outer sleeve module 3 is fixed to the knuckle module 1. The one end of the barrel element 32 is close to the knuckle module 1, and the one end of the barrel element 32 is fastened to the base 311 of the supporting holder 31. A middle of a front surface of the base 311 extends frontward to form the stepping portion 312. A middle of a front surface of the stepping portion 312 extends frontward to form the extending portion 313. The extending portion 313 surrounds the shaft coupler 23 and a rear end of the fixing element 213 of the telescopic module 2.

One end surface of the extending portion 313 is formed as the blocking surface 314. A front surface of the extending portion 313 is defined as the blocking surface 314. The supporting holder 31 defines the first location hole 315 longitudinally penetrating through the blocking surface 314. The blocking surface 314 is a ring shape. A front end of the fixing element 213 of the telescopic module 2 passes through the first location hole 315, and the rear end of the fixing element 213 of the telescopic module 2 is blocked behind a front end of the extending portion 313 and the blocking surface 314. The blocking surface 314 surrounds the front end of the fixing element 213, so the blocking surface 314 is fastened around the fixing element 213 to realize that the supporting holder 31 of the outer sleeve module 3 is located to the ball screw assembly 21 of the telescopic module 2, and the supporting holder 31 of the outer sleeve module 3 is fixed to the ball screw assembly 21 of the telescopic module 2. The two lacking grooves 316 are disposed between the stepping portion 312 and the extending portion 313. The two lacking grooves 316 penetrate through the stepping portion 312 and the extending portion 313 along an up-down direction. The two lacking grooves 316 extend to the stepping portion 312 and the front end of the extending portion 313. The two lacking grooves 316 are used for conveniently assembling the shaft coupler 23 of the telescopic module 2 to the screw shaft 211 and the first flange 22 and reducing a weight of the supporting holder 31 of the outer sleeve module 3. In the preferred embodiment, the base 311, the stepping portion 312 and the extending portion 313 are cylindrical. A diameter of the base 311, a diameter of the stepping portion 312 and a diameter of the extending portion 313 are progressively decreased in sequence.

Referring to FIG. 1 to FIG. 11, each extending plate 33 has a reinforcing rib 331, a plurality of second location holes 332 and a plurality of first locking structures 333. A middle of an outer surface of each extending plate 33 protrudes outward and extends longitudinally to form the reinforcing rib 331. The reinforcing rib 331 of each extending plate 33 is used for reinforcing a structural strength of each extending plate 33. One end of each extending plate 33 defines the plurality of the second location holes 332 vertically penetrating through each extending plate 33. The plurality of the second location holes 332 are adjacent to the inner sleeve module 4. The plurality of the second location holes 332 are located to two opposite sides of the reinforcing rib 331 of each extending plate 33.

The plurality of the second location holes 332 are corresponding to corresponding sections of the plurality of the sliders 35. The plurality of the second location holes 332 of the two extending plates 33 are locked with the corresponding segments of the plurality of the sliders 35 through a plurality of first bolts (not shown) to realize that the two extending plates 33 are located to the plurality of the sliders 35, and the two extending plates 33 are fixed to the plurality of the sliders 35. Two opposite sides of each extending plate 33 have the plurality of the first locking structures 333. The plurality of the first locking structures 333 of the two extending plates 33 are corresponding to corresponding portions of the two side covers 34. The plurality of the first locking structures 333 of the two extending plates 33 are locked with the corresponding portions of the two side covers 34 through a plurality of second bolts (not shown) to realize that the two extending plates 33 are located to the two side covers 34, and the two extending plates 33 are fixed to the two side covers 34.

Two opposite sides of each side cover 34 have a plurality of second locking structures 341, respectively. The plurality of the second locking structures 341 of the two side covers 34 are corresponding to the plurality of the first locking structures 333 of the two extending plates 33. The plurality of the second locking structures 341 of the two side covers 34 abut against the plurality of the first locking structures 333 of the two extending plates 33. The plurality of the second locking structures 341 of the two side covers 34 are locked with the plurality of the first locking structures 333 of the two extending plates 33 through the plurality of the second bolts to realize that the two side covers 34 are located to the two extending plates 33, and the two side covers 34 are fixed to the two extending plates 33. In the preferred embodiment, a front of one end of one side cover 34 is recessed rearward to form a notch 342. The notch 342 is convenient for a tracing of the modular telescopic arm by motor control 100.

Each slider 35 has a plurality of blind holes 351 and an indentation 352. The plurality of the blind holes 351 of the plurality of the sliders 35 face the plurality of the second location holes 332 of the two extending plates 33. The plurality of the blind holes 351 of the plurality of the sliders 35 are corresponding to the plurality of the second location holes 332 of the two extending plates 33. The plurality of the first bolts penetrate through the plurality of the second location holes 332 of the two extending plates 33, and then the plurality of the first bolts are fastened in the plurality of the blind holes 351 of the plurality of the sliders 35, so the plurality of the sliders 35 are fastened to the two front ends of the two inner surfaces of the two extending plates 33. A middle of an inner surface of each slider 35 is recessed vertically to form the indentation 352. The indentation 352 is used for receiving a corresponding component of the inner sleeve module 4, so the inner sleeve module 4 is able to be stretched or retracted.

Referring to FIG. 1 to FIG. 13, the inner sleeve module 4 is mounted to one end of the outer sleeve module 3. The inner sleeve module 4 is opposite to the knuckle module 1 with respect to the outer sleeve module 3. The outer sleeve module 3 surrounds the inner sleeve module 4. The inner sleeve module 4 has a hollow telescopic shaft 41, a third flange 42 and two slide rails 43. The third flange 42 is disposed to one end of the telescopic shaft 41. The other end of the telescopic shaft 41 surrounds the nut 212 of the telescopic module 2. One side of each slide rail 43 is disposed in a corresponding area of the telescopic shaft 41. The other side of each slide rail 43 is disposed in the indentations 352 of the sliders 35 of one extending plate 33, so the inner sleeve module 4 is able to be lengthened and shortened, that is to say, the inner sleeve module 4 is able to be retracted into the outer sleeve module 3 or stretched out of the outer sleeve module 3. The other end of the inner sleeve module 4 has the third flange 42. The third flange 42 is used for being connected to the other knuckle modules 1 of the modular telescopic arm by motor control 100 to form the multi-axis robot arm.

The telescopic shaft 41 has two assembling grooves 411, a plurality of assembling holes 412, a fastening groove 413 and a perforation 414. A top and a bottom of the telescopic shaft 41 are recessed inward to form the two assembling grooves 411, respectively. The two assembling grooves 411 are corresponding to the two slide rails 43. The one sides of the two slide rails 43 are disposed in the two assembling grooves 411 of the telescopic shaft 41, and the other sides of the two slide rails 43 are slidably disposed in the indentations 352 of the plurality of the sliders 35 of the two extending plates 33 of the outer sleeve module 3. The inner sleeve module 4 is able to be longitudinally telescopic by a connection of the two slide rails 43 and the plurality of the sliders 35 of the two extending plates 33. The telescopic shaft 41 has the plurality of the assembling holes 412. The plurality of the assembling holes 412 penetrate through inner walls of the two assembling grooves 411 along the up-down direction. Each slide rail 43 has a plurality of third location holes 431 penetrating through a top surface and a bottom surface of each slide rail 43 along the up-down direction.

The plurality of the assembling holes 412 of the telescopic shaft 41 are corresponding to the plurality of the third location holes 431 of the two slide rails 43. The plurality of the assembling holes 412 of the telescopic shaft 41 are locked with the plurality of the third location holes 431 of the two slide rails 43 through a plurality of third bolts (not shown) to realize that the two slide rails 43 are located to the telescopic shaft 41, and the two slide rails 43 are fixed to the telescopic shaft 41. A middle of the other end of the telescopic shaft 41 is recessed inward to form the fastening groove 413. The perforation 414 penetrates through middles of a front surface and a rear surface of the telescopic shaft 41. The nut 212 of the telescopic module 2 is fastened in the fastening groove 413 and the perforation 414. A front end of the screw shaft 211 of the telescopic module 2 and the limiting ring 24 are disposed in the perforation 414 of the inner sleeve module 4.

Referring to FIG. 1 to FIG. 11, in the preferred embodiment, when the modular telescopic arm by motor control 100 is lengthened or shortened, the nut 212 of the telescopic module 2 drives the inner sleeve module 4 to axially move towards the limiting ring 24 or away from the limiting ring 24, the telescopic length 90 of the inner sleeve module 4 is the movement length of the nut 212 and the inner sleeve module 4 moving towards the limiting ring 24 or moving away from the limiting ring 24. When the nut 212 of the telescopic module 2 is located the retracting position, a gap 92 is formed between a front end of the outer sleeve module 3 and the third flange 42 of the inner sleeve module 4. The gap 92 is defined an origin of the telescopic length 90 to conveniently measure the telescopic length 90. In the concrete implementation, the front end of the outer sleeve module 3 and the third flange 42 of the inner sleeve module 4 are without being limited to form the gap 92. The front end of the outer sleeve module 3 and inner sleeve module 4 are able to be contacted with each other.

In the preferred embodiment, the modular telescopic arm by motor control 100 is made of an aluminum alloy. In the concrete implementation, the modular telescopic arm by motor control 100 is without being limited to be made of the aluminum alloy.

As described above, the knuckle module 1 of the modular telescopic arm by motor control 100 controls the telescopic distance of the inner sleeve module 4, according to the users' needs, the modular telescopic arm by motor control 100 is able to adjust the telescopic length 90 in the multiple sections of the modular telescopic arm by motor control 100, the modular telescopic arm by motor control 100 is able to adjust a lengthening distance and a shortening distance during a usage process of the modular telescopic arm by motor control 100, and according to users' requirements, the lengthening distance and the shortening distance are able to be adjusted in the multiple sections of the modular telescopic arm by motor control 100, so the lengthening distance and the shortening distance of the modular telescopic arm by motor control 100 are able to be changed discretionarily. As a result, an accuracy and a usage scope of the modular telescopic arm by motor control 100 are greatly improved.

What is claimed is:

1. A modular telescopic arm by motor control, comprising:
   a knuckle module;
   a telescopic module disposed to one end of the knuckle module, the telescopic module including a ball screw assembly and a limiting ring, the limiting ring being disposed to one end of the ball screw assembly, the ball screw assembly having a screw shaft disposed longitudinally, and a nut disposed around the screw shaft, the nut being able to slide along the screw shaft, the limiting ring being disposed at a free end of the screw shaft, and the limiting ring facing one end of the nut;
   an outer sleeve module mounted around the one end of the knuckle module, and the outer sleeve module surrounding the telescopic module, the screw shaft being longitudinally mounted in the outer sleeve module; and
   an inner sleeve module being disposed to the one end of the knuckle module, and the inner sleeve module surrounding a part of the telescopic module, the outer sleeve module surrounding the inner sleeve module, the inner sleeve module surrounding a portion of the screw shaft and the limiting ring, one end of the inner sleeve module being fastened around the nut;
   wherein when the modular telescopic arm by motor control is lengthened or shortened, the nut of the telescopic module drives the inner sleeve module to axially move towards the limiting ring or away from the limiting ring, the inner sleeve module is stretched out of the outer sleeve module or retracted into the outer sleeve module, a telescopic length of the inner sleeve module is a movement length of the nut and the inner sleeve module moving towards the limiting ring or moving away from the limiting ring.

2. The modular telescopic arm by motor control as claimed in claim 1, wherein the knuckle module includes a motor, a circuit board and a rear cover, the circuit board is mounted to a rear end of the motor of the knuckle module, the rear cover of the knuckle module covers the circuit board of the knuckle module, a front end of the motor of the knuckle module has an outer shoulder, a middle shoulder and an inner shoulder, a periphery of the front end of the motor of the knuckle module protrudes frontward and outward to form the outer shoulder, a middle of a front end of the outer shoulder of the motor extends frontward to form the middle shoulder, a periphery of a middle of a front end of the middle shoulder of the motor extends frontward to form the inner shoulder, the outer shoulder and the middle shoulder are cylindrical, the inner shoulder is an annular shape, a diameter of the outer shoulder, a diameter of the middle shoulder, an outer diameter of the inner shoulder and an inner diameter of the inner shoulder are progressively decreased in sequence.

3. The modular telescopic arm by motor control as claimed in claim 2, wherein the telescopic module includes a first flange and a shaft coupler, the first flange is fastened to the inner shoulder of the knuckle module, the shaft coupler is disposed between the ball screw assembly and the first flange, one end of the shaft coupler is connected with the ball screw assembly, and the other end of the shaft coupler is connected with the first flange.

4. The modular telescopic arm by motor control as claimed in claim 3, wherein the ball screw assembly has a fixing element, the nut is disposed between the fixing element and the limiting ring, the fixing element is disposed between the nut and the first flange, the shaft coupler is disposed to one end of the screw shaft of the ball screw assembly, and the shaft coupler is close to one end of the fixing element of the ball screw assembly, the limiting ring is disposed to the other end of the screw shaft of the ball screw assembly, the limiting ring faces a front end of the nut.

5. The modular telescopic arm by motor control as claimed in claim 4, wherein the outer sleeve module includes a supporting holder, one end of the supporting holder is fastened to the outer shoulder and the middle shoulder of the knuckle module, the other end of the supporting holder surrounds the fixing element of the telescopic module.

6. The modular telescopic arm by motor control as claimed in claim 5, wherein the supporting holder has a base, a stepping portion, an extending portion, a blocking surface, a first location hole and two lacking grooves, the base is fastened to the outer shoulder and the middle shoulder of the knuckle module, a front surface of the base extends frontward to form the stepping portion, a front surface of the stepping portion extends frontward to form the extending portion, the extending portion surrounds the shaft coupler and a rear end of the fixing element of the telescopic module, one end surface of the extending portion is formed as the blocking surface, the supporting holder defines the first location hole longitudinally penetrating through the blocking surface, a front end of the fixing element passes through the first location hole, and a rear end of the fixing element is blocked behind a front end of the extending portion and the blocking surface, the two lacking grooves are disposed between the stepping portion and the extending portion, the two lacking grooves extend to the stepping portion and the front end of the extending portion, the base, the stepping portion and the extending portion are cylindrical, a diameter of the base, a diameter of the stepping portion and a diameter of the extending portion are progressively decreased in sequence.

7. The modular telescopic arm by motor control as claimed in claim 6, wherein the outer sleeve module includes a barrel element, the barrel element surrounds the supporting holder, one end of the barrel element is close to the knuckle module, and the one end of the barrel element is fastened to the base of the supporting holder, the other end of the barrel element is away from the knuckle module.

8. The modular telescopic arm by motor control as claimed in claim 7, wherein two portions of the other end of the barrel element extend frontward and towards the limiting ring of the telescopic module to form two extending plates, each extending plate has a reinforcing rib and a plurality of second location holes, a middle of an outer surface of each extending plate protrudes outward and extends longitudinally to form the reinforcing rib, one end of each extending plate defines the plurality of second location holes vertically penetrating through each extending plate, the plurality of the second location holes are adjacent to the inner sleeve module, the plurality of the second location holes are located to two opposite sides of the reinforcing rib of each extending plate.

9. The modular telescopic arm by motor control as claimed in claim 8, wherein the outer sleeve module includes two side covers, one side cover is disposed between two sides of two extending plates, the other side cover is disposed between the other two sides of the two extending plates, two opposite sides of each extending plate have a plurality of first locking structures, two opposite sides of each side cover have a plurality of second locking structures, respectively, the plurality of the second locking structures of the two side covers are corresponding to the plurality of the first locking structures of the two extending plates, the plurality of the second locking structures of the two side covers abut against the plurality of the first locking structures of the two extending plates, a front of one end of one side cover is recessed rearward to form a notch.

10. The modular telescopic arm by motor control as claimed in claim 9, wherein the outer sleeve module includes a plurality of sliders, an inner surface of each extending plate has two sliders arranged longitudinally, the two sliders of one extending plate are opposite to the two sliders of the other extending plate, each slider has a plurality of blind holes, the plurality of the blind holes of the plurality of the sliders are corresponding to the plurality of the second location holes of the two extending plates.

11. The modular telescopic arm by motor control as claimed in claim 10, wherein the inner sleeve module has a hollow telescopic shaft, a third flange and two slide rails, a top and a bottom of the telescopic shaft are recessed inward to form two assembling grooves, respectively, a middle of an inner surface of each slider is recessed vertically to form an indentation, the third flange is disposed to one end of the telescopic shaft, the other end of the telescopic shaft surrounds the nut of the telescopic module, the two assembling grooves are corresponding to the two slide rails, one sides of the two slide rails are disposed in the two assembling grooves, and the other sides of the two slide rails are slidably disposed in the indentations of the plurality of the sliders of the two extending plates.

12. The modular telescopic arm by motor control as claimed in claim 11, wherein the telescopic shaft has a plurality of assembling holes, a fastening groove and a perforation, the plurality of the assembling holes penetrate through inner walls of the two assembling grooves along an up-down direction, each slide rail has a plurality of third location holes penetrating through a top surface and a bottom surface of each slide rail along the up-down direction, the plurality of the assembling holes of the telescopic shaft are corresponding to the plurality of the third location holes of the two slide rails, a middle of the other end of the telescopic shaft is recessed inward to form the fastening groove, the perforation penetrates through middles of a front surface and a rear surface of the telescopic shaft, the nut of the telescopic module is fastened in the fastening groove and the perforation, a front end of the screw shaft of the telescopic module and the limiting ring are disposed in the perforation of the inner sleeve module.

13. The modular telescopic arm by motor control as claimed in claim 1, wherein the modular telescopic arm by motor control is made of an aluminum alloy.

14. The modular telescopic arm by motor control as claimed in claim 1, further comprising an outer cover and a plurality of fastening elements, the outer cover being disposed to one side of the knuckle module, the plurality of the fastening elements being disposed to one side of the outer sleeve module and one side of the inner sleeve module, respectively, the telescopic module, the outer sleeve module, the inner sleeve module and the plurality of the fastening elements being disposed to the same end of the knuckle module.

15. A modular telescopic arm by motor control, comprising:
  a knuckle module, a front end the knuckle module having an outer shoulder, a middle shoulder and an inner shoulder, a periphery of the front end of the knuckle module protruding frontward and outward to form the outer shoulder, a middle of a front end of the outer shoulder extending frontward to form the middle shoulder, a periphery of a middle of a front end of the middle shoulder extending frontward to form the inner shoulder;
  a telescopic module mounted to the front end of the knuckle module, the telescopic module including a ball screw assembly, a first flange, a shaft coupler and a limiting ring, the first flange being fastened to the inner shoulder of the knuckle module, one end of the shaft coupler being connected with the ball screw assembly, the other end of the shaft coupler being connected with the first flange, the ball screw assembly having a screw shaft disposed longitudinally, a nut disposed around the screw shaft, and a fixing element, the nut being disposed between the fixing element and the limiting ring, the fixing element being disposed between the nut and the first flange, the shaft coupler being disposed to the screw shaft of the ball screw assembly, and the shaft coupler being close to one end of the fixing element of the ball screw assembly, the limiting ring being disposed to the screw shaft of the ball screw assembly, and the limiting ring facing one end of the nut of the ball screw assembly;
  an outer sleeve module mounted around the one end of the knuckle module, and the outer sleeve module surrounding the telescopic module, the screw shaft being longitudinally mounted in the outer sleeve module; and
  an inner sleeve module disposed to the one end of the knuckle module, and the inner sleeve module surrounding a portion of the screw shaft and the limiting ring, the outer sleeve module surrounding the inner sleeve module, one end of the inner sleeve module being fastened around the nut;
  wherein when the modular telescopic arm by motor control is lengthened or shortened, the nut of the telescopic module drives the inner sleeve module to axially move towards the limiting ring or away from the limiting ring, the inner sleeve module is stretched out of the outer sleeve module or retracted into the outer sleeve module, a telescopic length of the inner sleeve module is a movement length of the nut and the inner sleeve module moving towards the limiting ring or moving away from the limiting ring.

16. A modular telescopic arm by motor control, comprising:
- a knuckle module;
- a telescopic module disposed to one end of the knuckle module, the telescopic module including a ball screw assembly and a limiting ring, the limiting ring being disposed to one end of the ball screw assembly, the ball screw assembly having a screw shaft disposed longitudinally, and a nut disposed around the screw shaft, the nut being able to slide along the screw shaft, the limiting ring being disposed at a free end of the screw shaft, and the limiting ring facing one end of the nut;
- an outer sleeve module mounted around the one end of the knuckle module, and the outer sleeve module surrounding the telescopic module, the screw shaft being longitudinally mounted in the outer sleeve module, an upper portion and a lower portion of an inner surface of the outer sleeve module being connected with a plurality of sliders, a middle of an inner surface of each slider being recessed vertically to form an indentation; and
- an inner sleeve module being disposed to the one end of the knuckle module, and the inner sleeve module surrounding a part of the telescopic module, the outer sleeve module surrounding the inner sleeve module, the inner sleeve module surrounding a portion of the screw shaft and the limiting ring, one end of the inner sleeve module being fastened around the nut, the inner sleeve module having a hollow telescopic shaft, a third flange and two slide rails, a top and a bottom of the telescopic shaft being recessed inward to form two assembling grooves, respectively, the third flange being disposed to one end of the telescopic shaft, the other end of the telescopic shaft surrounding the nut of the telescopic module, one sides of the two slide rails being disposed in the two assembling grooves, and the other sides of the two slide rails being slidably disposed in the indentations of the plurality of the sliders;
- wherein when the modular telescopic arm by motor control is lengthened or shortened, the nut of the telescopic module drives the inner sleeve module to axially move towards the limiting ring or away from the limiting ring, the inner sleeve module is stretched out of the outer sleeve module or retracted into the outer sleeve module, a telescopic length of the inner sleeve module is a movement length of the nut and the inner sleeve module moving towards the limiting ring or moving away from the limiting ring.

* * * * *